Feb. 29, 1944.  F. H. OGDEN  2,343,202
CLOTH CUTTING MACHINE
Filed Dec. 9, 1942  2 Sheets-Sheet 1
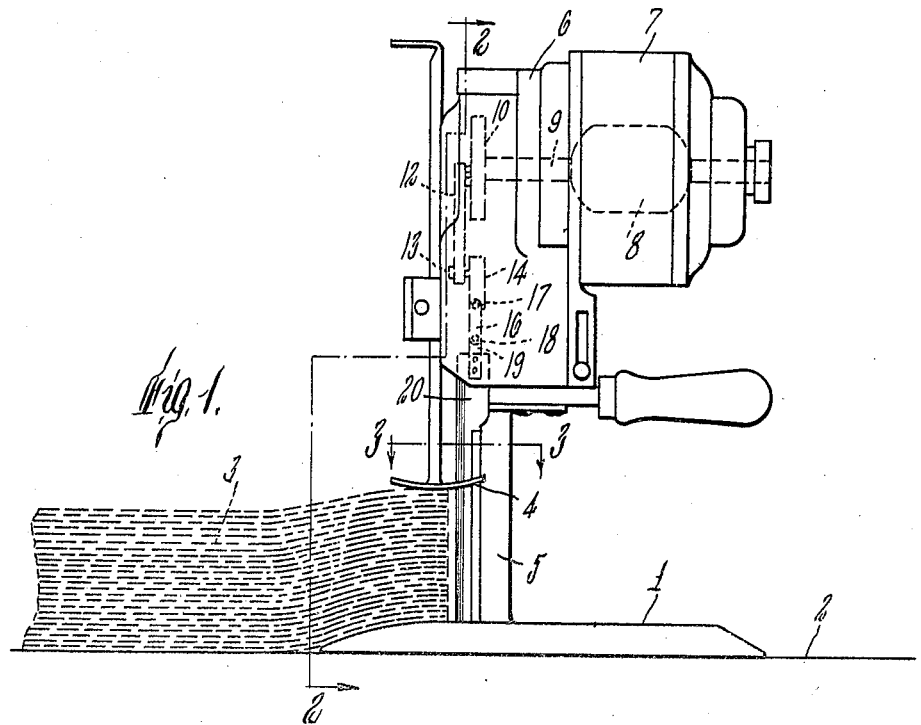
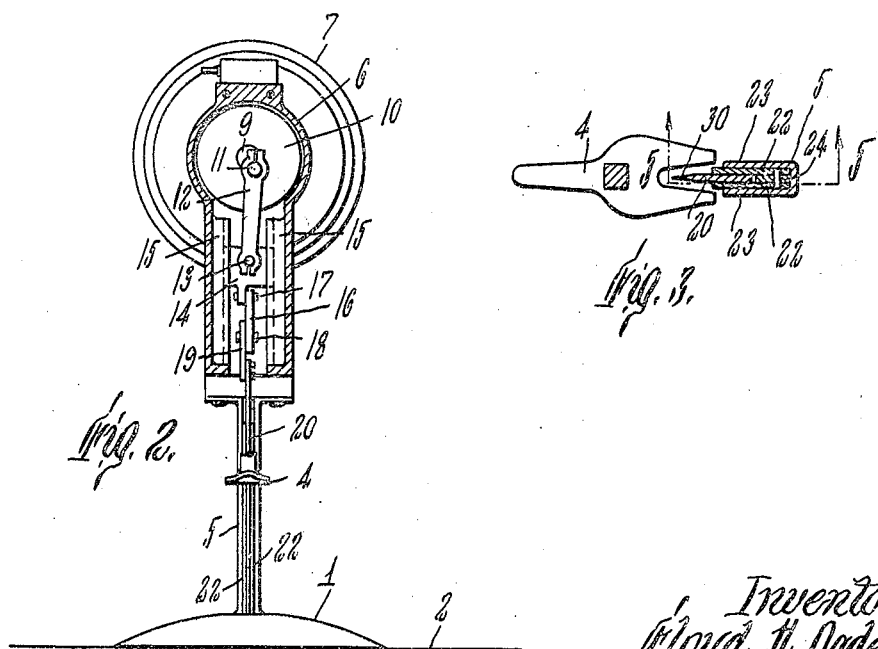
Inventor
Floyd H. Ogden Feb. 29, 1944. F. H. OGDEN 2,343,202
CLOTH CUTTING MACHINE
Filed Dec. 9, 1942 2 Sheets-Sheet 2
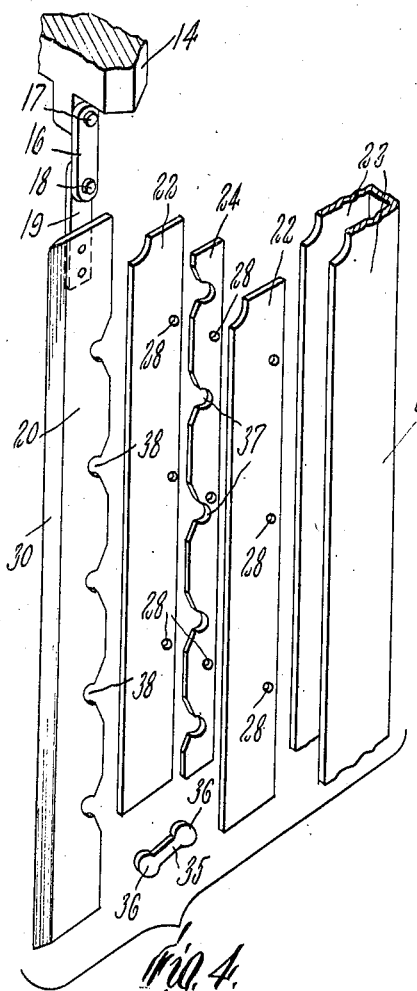
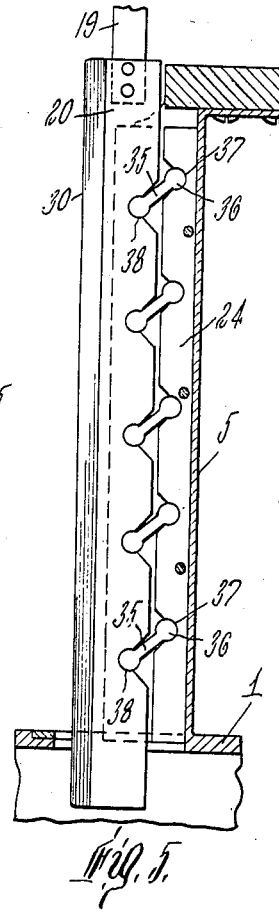
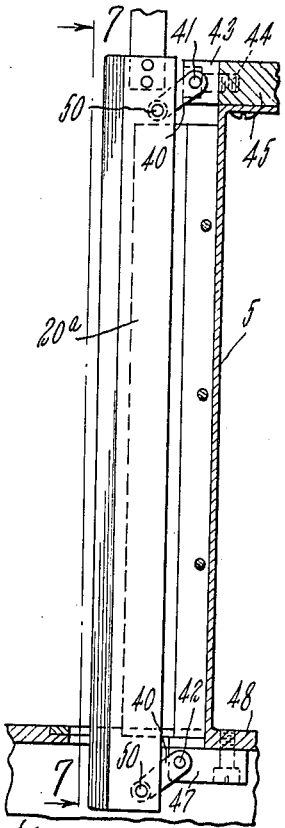
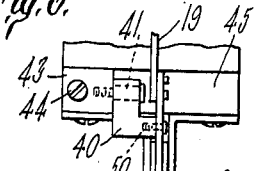
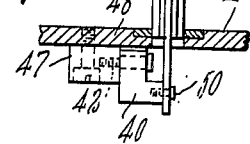
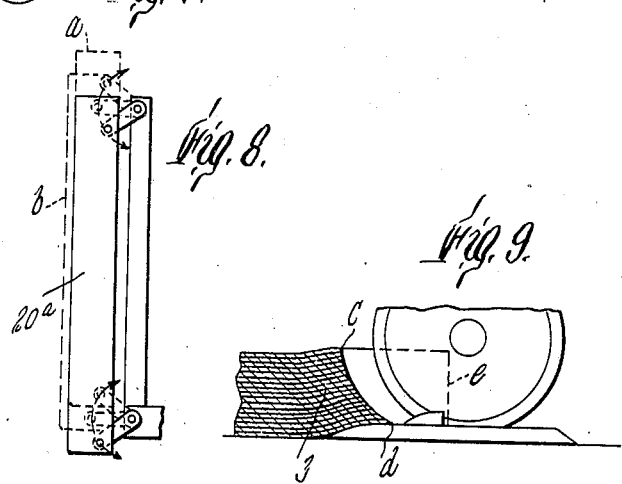

Patented Feb. 29, 1944

2,343,202

UNITED STATES PATENT OFFICE 2,343,202

CLOTH CUTTING MACHINE

Floyd H. Ogden, Arlington, Mass.

Application December 9, 1942, Serial No. 468,405

6 Claims. (Cl. 30—275)

This invention relates to cloth cutting machines. Such machines heretofore have been usually of either of two types, one using a rotary disk knife and the other using a vertically reciprocating blade knife. Due to the arc of curvature of the disk knife, uniformity of cutting of superposed layers, particularly where the contour cut is irregular, is impossible, since the cut is further advanced adjacent to the horizontal diameter of the knife than elsewhere at any one time. Because of this no substantial thicknesses or "high lays" of fabric layers can well be cut at one time. This objection is avoided by the use of a vertically reciprocating straight blade knife, but such a knife does not work satisfactorily on sheer fabrics, the changes of direction of the knife motion acting to displace the fabric and causing ragged cutting. Moreover, the reciprocating straight knife makes feeding of the machine into the work much more difficult, particularly where the pile or lay of fabric to be cut is of considerable thickness, than does a rotary disk knife. It is also customary with the straight knives to lift the lower edge of the knife blade on its up stroke above the top of the cloth plate, which tends to improve the ease of feed, but in the case of high lays, there is liability, particularly when a sudden turn is made, of the lower end of the knife blade becoming twisted out of position which may result in breaking the knife blade.

The present invention has for an object to produce a cloth cutting machine having the cutting accuracy of the reciprocating knife and its capacity to cut a high lay of fabric, but which can be used satisfactorily to cut sheer fabrics and which is very easily fed relative to the lay and in which the knife blade is protected against breakage. To these ends a reciprocating knife is employed, but instead of causing such reciprocation to take place in a straight path, this reciprocation is in an arcuate path so that the knife edge advances and then retracts relative to the work during its reciprocation.

For a more complete understanding of this invention, reference may be had to the accompanying drawings in which Figure 1 is a side elevation of a cloth cutting machine constructed in accordance with this invention and in position about to start a cut.

Figures 2 and 3 are detail sectional views on lines 2—2 and 3—3, respectively, of Figure 1.

Figure 4 is an exploded perspective view showing the knife blade and its mounting for one embodiment of this invention.

Figure 5 is a detail sectional view on line 5—5 of Figure 3.

Figure 6 is a view similar to Figure 5, but showing a modified construction.

Figure 7 is a sectional view on line 7—7 of Figure 6.

Figure 8 is a diagram showing the motion of the blade for the construction shown in Figure 7.

Figure 9 is a diagrammatic view illustrating an inaccuracy inherent in rotary disk cutting machines.

As shown best in Figure 1, the machine comprises the usual cloth plate 1 which is slidable along the top of a table 2 upon which the cloth to be cut is stacked in a lay as indicated at 3, the cloth plate passing in beneath the lay of fabric. Against the top face of this lay there is positioned a presser foot 4, this being supported in the usual way by the frame of the machine.

Extending upwardly from the cloth plate 1 there is shown a standard 5 at the upper end of which is positioned a head 6. This head carries a motor 7, the armature 8 of which is mounted on an armature shaft 9 provided with a crank disk 10 at its forward end. This crank disk carries a crank pin 11 on which is journaled a connecting rod 12, the lower end of which is pivoted at 13 (see Figure 2) to a cross head 14 slidable in ways 15 carried by or forming part of the head 6. This cross head 14 is pivotally connected through a link 16 pivoted at its upper end at 17 to a downward projecting portion of the cross head, and at 18 at its lower end to an extension 19 secured as by riveting, or the like, to the upper end of a straight knife blade 20. This knife blade, as shown best in Figures 3, 4 and 5, is slidable between a pair of hardened steel inserts 22 which are positioned between the side walls 23 of the standard 5, which as shown, is of U cross section. Back of the blade 20 is shown a back plate 24. The back plate and the inserts may be removably secured in position between the sides 23 of the standard as by screws passing through mating holes 28 in these parts. The forward edge 30 of the knife blade is thus held projecting forwardly of the standard and the knife blade is guided for reciprocatory motion by the inserts 22.

In order to provide for the desired forward and backward motion of the knife edge as well as the up and down motion, the knife blade is supported by the standard through a parallel motion, so that the edge of the blade remains upright, although in addition to its up and down motion it is moved forwardly and rearwardly. As shown in Figures 4 and 5 this parallel motion mechanism comprises a plurality of links 35 each having enlarged disk shaped ends 36. Opposite ends of each link 35 are journaled in recesses 37 and 38 in the confronting faces of the back plate 24 and the back edge of the knife 20. These arcuate recesses have wall portions extending throughout somewhat more than 180° so that when the disk end portions are inserted therein laterally, they are held against removal endwise from either the blade or the back plate, and the knife blade being positioned between the inserts 22, these inserts hold the links 35 in the plane of the knife blade and the back plate so that the parts are held assembled. By removing the screws which fasten the inserts and the back plate to the standard, these inserts, back plate and the knife blade may be removed from the standard, whereupon by removing one of the inserts from the assembly, the blade may be easily detached from the assembly.

With this arrangement when the cross head 14 is reciprocated, the knife blade is given not only an up and down motion, but a forward and backward motion in a curved path, although its cutting edge remains in vertical position. The parts are also so formed that the lower edge of the knife blade is never above the top surface of the throat plate 1, so that there is no opportunity for material to become wedged beneath the blade, and the blade is fully supported for its entire length over which it contacts the work so that it cannot be displaced and be broken.

Instead of mounting the knife blade on the links 35 as shown, it may be supported adjacent to its ends on L shaped hangers 40, as shown in Figures 6 and 7. Each of these hangers is pivoted as on the pins 41 and 42, the pin 41 being secured to a block 43, secured as by a screw 44 to a frame member 45 of the machine. The pin 42 is similarly supported by a block 47 screwed to the lower surface of the upper wall member 48 of the cloth plate 1. The forward end of each link 40 is pivotally connected to the blade 20a as by means of the pivot screws 50.

In Figure 8 is shown diagrammatically the type of path described by the cutting edge of the knife blade with either of the mountings described, the knife blade not only moving vertically as between the full line position and the dotted line position a, but also being rocked forwardly and then back, as shown by the vertical full line and the dotted line b. As shown the blade moves substantially the same distance above and below the point where the suspending links are horizontal so that at each complete vertical traverse of the knife it first moves forwardly and then moves backwardly by an equal amount, but it is within the scope of this invention to provide for unequal extents of motion on either side of the central position, or to make all the motion on one side so that, for example, on each down stroke of the knife blade it moves forwardly and at each up stroke it moves rearwardly, or vice versa. For most classes of work, the symmetrical in and out motion on each direction of stroke is desirable, but for certain special classes of work it may be found desirable to make the stroke non-symmetrical as hereinbefore indicated. It is also desirable that the up and down stroke be fairly short, as this provides less vertical relative motion between the knife blade and the cloth, which reduces friction so that the machine runs cooler. This adds to the life of the knife blade and avoids tendency to burn the fabric.

It will be noted that since the knife not only has a vertical reciprocating stroke, but also has a forward and backward motion, the forward motion acts to feed the knife into the work and as this motion is rapid, the inertia of the machine as a whole causes this motion to be entirely a feed motion of the cutting edge into the work. Thus the operator merely has to follow up this feed motion by sliding the machine forwardly on the table, so that the feed is very easy and may be made very rapid. The up and down motion of the knife blade also tends to fluff up the various layers of material, letting air in between them, resulting in a cooling effect on both the knife and the work, and the somewhat chopping feed action provides a smooth cut even on sheer fabrics which can be presented to the machine in a much higher layer than is possible with machines not having this type of knife motion. Heretofore it has been found unsatisfactory to attempt to cut sheer fabrics with a vertically reciprocating knife, but the machine with the knife stroke as herein described is quite satisfactory for this purpose. Where sheer fabrics have been cut heretofore it has been necessary to use a rotary cutter, but as illustrated in Fig. 9 a high lay cannot be cut accurately with a rotary cutter because of the inaccuracies in cutting produced by the curvature of the knife blade. Referring to this figure wherein the knife has been shown somewhat retracted for the sake of clarity, it will be seen that the top of the lay has been cut to the depth indicated at c, while the bottom of the lay has been cut only to the depth indicated at d from the starting edge of the cloth at e.

From the foregoing description of certain embodiments of this invention, it will be understood that various changes and modifications might be made without departing from the spirit or scope of this invention.

I claim:

1. In a cloth cutting machine having a cloth plate and a standard extending upwardly from said cloth plate, a knife blade having an edge projecting forwardly of said standard, means supporting said blade for motion in an arcuate path with said edge maintained in upright position and with the lower edge of said blade always beneath the top face of said cloth plate, and means for reciprocating said blade in said path.

2. In a cloth cutting machine, a standard of U cross section, a knife blade carried by said standard and with a cutting edge projecting forwardly of said standard, a back plate back of said blade, the confronting edges of said blade and back plate having arcuate recesses therein, links having disk extremities rockably supported in the recesses of said blade and back plate, the walls of said recesses extending throughout more than 180°, and means connected to said blade for oscillating said blade.

3. In a cloth cutting machine, a standard of U cross section, a knife blade carried by said standard and with a cutting edge projecting forwardly of said standard, a back plate back of said blade, the confronting edges of said blade and back plate having arcuate recesses therein, links having disk extremities rockably supported in the recesses of said blade and back plate, the walls of said recesses extending throughout more than 180°, a cross head mounted for motion substantially parallel to said blade, a link pivoted at opposite ends to said blade and cross head, and means for reciprocating said cross head.

4. In a cloth cutting machine, a standard of

U cross section, spaced fixed inserts in said standard, a knife blade positioned between said inserts and with a cutting edge projecting forwardly of said standard, a back plate fixed between said inserts and back of said blade, the confronting edges of said blade and back plate having arcuate recesses therein, links having disk extremities rockably supported in the recesses of said blade and back plate and retained in position therein by said inserts, the walls of said recesses extending throughout more than 180°, and means connected to said blade for oscillating said blade.

5. In a cloth cutting machine, a standard, a knife blade carried by said standard and having a cutting edge projecting forwardly of said standard, the rear edge of said blade having arcuate recesses therein, links having forward disk extremities seated in said recesses, the walls of said recesses extending throughout more than 180°, means pivotally supporting the rear ends of said links, and means connected to said blade for oscillating said blade.

6. In a cloth cutting machine, a standard, a knife blade carried by said standard and having a cutting edge projecting forwardly of said standard, a back plate back of said blade and having arcuate recesses in its forward face, the walls of said recesses extending throughout more than 180°, links having rear disk extremities seated in said recesses, said links being pivotally secured to said blade, and means connected to said blade for oscillating said blade.

FLOYD H. OGDEN.